June 13, 1967  K. G. KREUTER  3,324,631
AIR DRYING MEANS
Filed Nov. 7, 1963
2 Sheets-Sheet 1

INVENTOR.
KENNETH G. KREUTER
BY
*Caudr & Caudr*
HIS ATTORNEYS

June 13, 1967 K. G. KREUTER 3,324,631
AIR DRYING MEANS

Filed Nov. 7, 1963 2 Sheets-Sheet 2

INVENTOR.
KENNETH G. KREUTER
BY Caudr & Caudr
HIS ATTORNEYS

United States Patent Office 3,324,631
Patented June 13, 1967

3,324,631
AIR DRYING MEANS
Kenneth G. Kreuter, Goshen, Ind., assignor to Robertshaw Controls Company, Richmond, Va., a corporation of Delaware
Filed Nov. 7, 1963, Ser. No. 322,084
18 Claims. (Cl. 55—163)

This invention relates to an improved apparatus for drying compressed air or the like.

It is well known to provide an apparatus having a desiccant, absorbent or adsorbent means therein and through which compressed air is forced so that the adsorbent means will remove moisture from the air whereby relatively dry compressed air will leave the apparatus for the desired use thereof.

However, in the past, relatively complicated and expensive apparatus have been provided for the above means because of the requirement for alternating the flow of compressed air through different adsorbent means so that each adsorbent means can be sequentially purged of the moisture thereof while the other dried absorbent means is removing moisture from the compressed air.

According to the teachings of this invention, however, an improved apparatus is provided wherein the cycling of the flow of compressed air through the different adsorbent means thereof is simply controlled by the pressure of the fluid in the apparatus in a manner hereinafter described.

Accordingly, it is an object of this invention to provide an improved fluid drying apparatus having one or more of the novel features set forth above or hereinafter shown or described.

Other objects, uses and advantages of this invention are apparent from a reading of this description which proceeds with reference to the accompanying drawings forming a part thereof and wherein.

Figure 1:
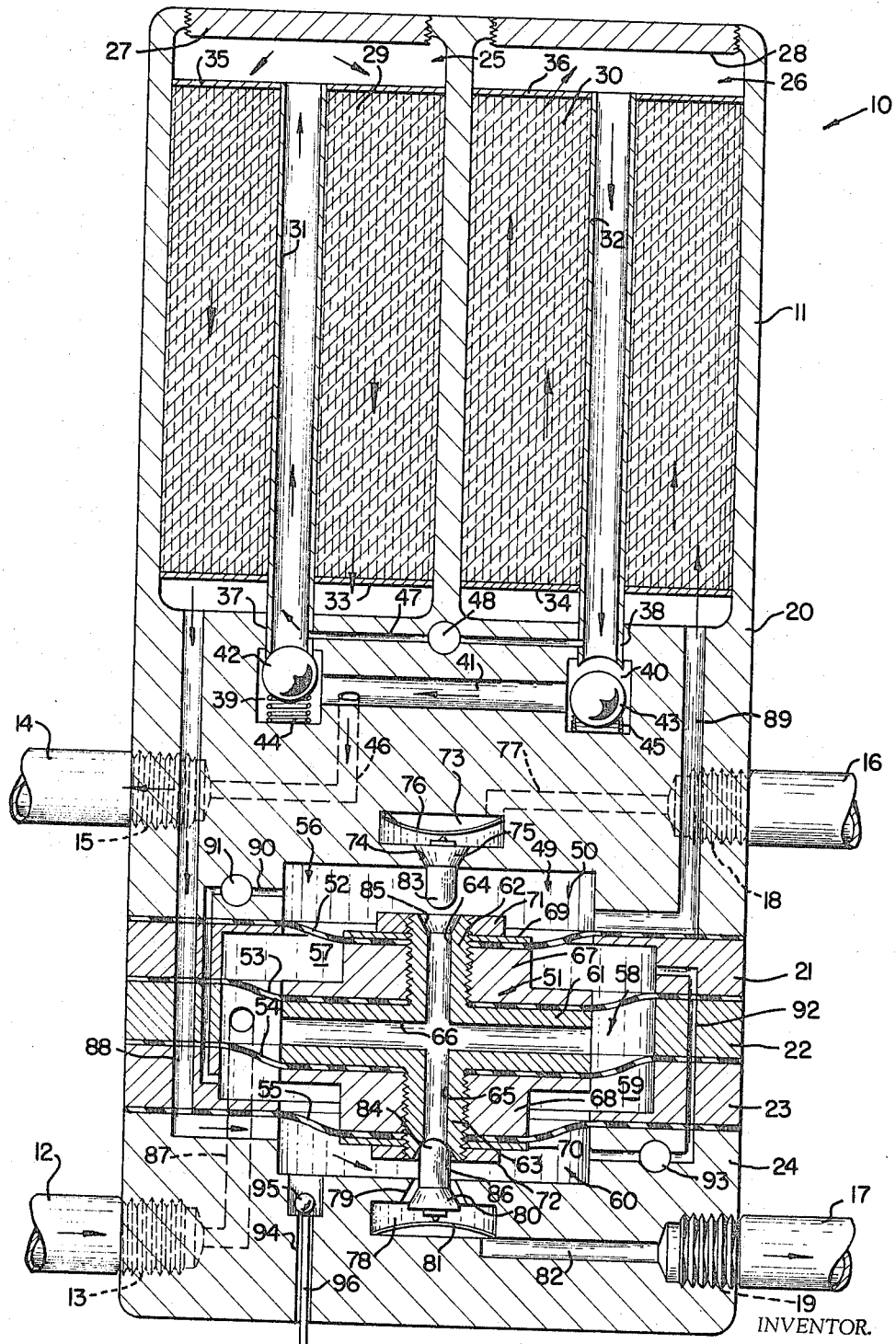
FIGURE 1 is an axial, cross-sectional view illustrating one embodiment of the improved apparatus of this invention.

While the various features of this invention are hereinafter described and illustrated as being particularly adaptable for drying compressed air, it is to be understood that the various features of this invention can be utilized singly or in any combination thereof for other purposes as desired.

Therefore, this invention is not to be limited to only the embodiment illustrated in the drawings, because the drawings are merely utilized to illustrate one of the wide variety of uses of this invention.

Referring now to FIGURE 1, the improved apparatus of this invention is generally indicated by the reference numeral 10 and comprises a self-contained unit formed from a housing 11 wherein all of the operating parts of the apparatus 10 of this invention are disposed in the housing 11.

Therefore, it can be seen that the drying unit 10 of this invention is relatively compact and can be easily shipped, stored and transported to the desired locations without having the various operating parts thereof subject to damage by impact and the like.

In particular, the only external connections to the self-contained drying unit 10 of this invention is performed at the desired location for use of the unit 10 by interconnecting a compressed air inlet conduit 12 to a threaded port 13 in the housing 10, an outlet dried air conduit 14 to a threaded port 15 in the housing 11, and exhaust outlet conduits 16 and 17 to threaded ports 18 and 19 in the housing 10.

Therefore, it can be seen that the self-contained drying unit 10 of this invention can be utilized by merely interconnecting the conduits 12, 14, 16 and 17 in the threaded ports 13, 15, 18 and 19 thereof in the manner illustrated in FIGURE 1 whereby compressed air will continuously enter the apparatus 10 through the conduit 12 and dried compressed air will continuously leave the apparatus 10 through the conduit 14 in a manner hereinafter described.

The housing 11 of the unit 10 comprises housing members 20, 21, 22, 23 and 24 secured together in stacked and sealed relation by bolt means (not shown) or the like to form the housing 11.

The housing 11 has a pair of cavities 25 and 26 formed therein and respectively sealed closed at the upper end by removable plugs 27 and 28. The cavities 25 and 26 respectively have desiccant or adsorbent means 29 and 30 disposed therein, the adsorbent means 29 or 30 being formed of any suitable material which will remove moisture from air or the like passing through the adsorbent means 29 and 30 so that the air will be dried by the adsorbent means 29 and 30.

For example, the adsorbent means 29 and 30 of this invention can be activated carbon, alumina, silica gel, glass wool, adsorbent cotton, soft tissue paper, and the like.

However, it is to be understood that the particular desiccant, absorbent, or adsorbent means of this invention utilized does not form a limitation on this invention and the term "adsorbent" will be utilized throughout this description and claims to denote a drying agent in general and not a specific type of drying agent.

The adsorbent means 29 and 30 respectively have tubes 31 and 32 passing completely therethrough and have the lower ends thereof closed by screens 33 and 34 while the upper ends thereof are closed by screens 35 and 36 for a purpose hereinafter described.

The lower ends 37 and 38 of the tubes 31 and 32 respectively extend into cavities 39 and 40 formed in the housing 11 and being interconnected together by a branch passage 41.

A pair of ball check valves 42 and 43 are respectively disposed in the cavities 39 and 40 and are normally urged upwardly to close the ends 37 and 38 of the tubes 31 and 32 by compression springs 44 and 45.

The branch passage 41 between the cavities 39 and 40 is interconnected to the outlet port 15 of the housing 11 by a passage 46 formed in the housing 11 for a purpose hereinafter described.

The ends 37 and 38 of the tubes 31 and 32 are interconnected together by a passage 47 formed in the housing 11 at a point disposed above the check valves 42 and 43 for a purpose hereinafter described, the passage 47 having a variable restrictor 48 therein for a purpose hereinafter described.

The housing members 20, 21, 22, 23 and 24 cooperate together to define a cavity 49 receiving a control means 50 of this invention.

The control means 50 includes a movable valve member 51 disposed in the cavity 49 and carrying a plurality of flexible diaphragms 52, 53, 54 and 55 respectively sandwiched between the housing members 20, 21; 21, 22; 22, 23; and 23, 24; in the manner illustrated in FIGURE 1.

In this manner, the valve member 51 and diaphragms 52–55 divide the cavity 49 of the housing 11 into five chambers 56, 57, 58, 59 and 60 for a purpose hereinafter described.

The valve member 51 includes a disc-like part 61 having externally threaded projections 62 and 63 extending from opposed sides thereof, the extensions 62 and 63 respectively having passages 64 and 65 passing therethrough and being interconnected to a passage 66 passing completely through the disc portion 61 as illustrated in FIGURE 1.

The diaphragms 53 and 54 have the inner peripheries thereof respectively sandwiched to opposed sides of the disc-like part 61 by retainers 67 and 68 threaded on the projection 62 and 63.

The diaphragms 52 and 55 are respectively disposed against the outer sides of the retainers 67 and 68 by washer-like plates 69 and 70 disposed over the projection 62 and 63 and fastened thereto by nut-like members 71 and 72, whereby it can be seen that the valve member 51 cooperates with the diaphragms 52–55 to form the chambers 56–60 into the housing 11.

The chamber 56 of the housing 11 is interconnected to a cavity 73 by a frusto-conical valve seat 74 normally closed by a frusto-conical valve member 75 urged to the closed position by a leaf spring 76 disposed in the cavity 73. The cavity 73 is interconnected to the exhaust port 18 by a passage 77 formed in the housing 11.

Similarly, the chamber 69 in the housing 11 is interconnected to a cavity 78 by a frusto-conical valve seat 79 normally closed by a valve member 80 urged to the closed position by a leaf spring 81 disposed in the cavity 78. The cavity 78 is, in turn, interconnected to the exhaust port 19 by a passage 82 formed in the housing 20.

The valve members 75 and 80 respectively have rounded ends 83 and 84 which are respectively adapted to seat in frusto-conical valve seats 85 and 86 formed at the end of the passages 64 and 65 of the valve member 51 for a purpose hereinafter described.

The compressed air inlet port 13 is interconnected to the chamber 58 of the housing 11 by a passage means 87.

The desiccant cavity 25 is interconnected to the chamber 60 of the housing 11 by a passage 88 while the desiccant chamber 26 of the housing 11 is interconnected to the chamber 56 by a passage 89.

In turn, the chamber 56 of the housing 11 is interconnected to the chamber 59 by a passage 90 having a variable restrictor 91 therein for a purpose hereinafter described.

Similarly, the chamber 60 of the housing 11 is interconnected to the chamber 57 by a passage 92 having a variable restrictor 93 therein.

The chamber 60 of the housing 11 is also interconnected to the exterior of the housing 11 by a passage 94 normally closed by a ball valve 95 carried on a stem 96 projecting out of the housing 11.

Therefore, it can be seen that the apparatus 10 of this invention is formed from a relatively few parts to operate in a novel manner now to be described.

After the conduits 12, 14, 16 and 17 have been respectively interconnected to the threaded ports 13, 15, 18 and 19 in the manner illustrated in FIGURE 1, and with the valve member 51 disposed in the position illustrated in FIGURE 1 wherein the valve member 51 opens the valve member 80 from the seat 79 and has the passage 65 thereof closed by the end 84 of the valve member 80, compressed air is fed into the chamber 58 of the housing 11 from the conduit 12 whereby the compressed air passes out of the valve member 51 at the opened end 85 of the passage 64 to flow from the cavity 56 to the lower end of the desiccant chamber 26 by means of the passageway 89, the valve seat 74 being closed by the valve member 75 under the urging of the leaf spring 76 in the manner illustrated in FIGURE 1.

The compressed air in the lower end of the desiccant chamber 26 is forced upwardly by its own pressure through the screen 34 and through the adsorbent means 30 to be dried thereby whereby dried compressed air passes through the screen 36 to the upper end of the desiccant chamber 26 and is forced downwardly through the tube 32 to open the check valve 43 against the bias of the spring 45 and passes to the outlet conduit 14 by means of the interconnected passageways 41 and 46.

In this manner, compressed air continuously entering the apparatus 11 through the conduit 12 now continuously leaves the apparatus 10 through the conduit 14 after the same has been dried by the desiccant 30.

However, part of the dried compressed air flowing down through the tube 32, FIGURE 1, is bled off by the passageway 47 through the variable restrictor 48 to the interior of the tube 31 whereby the dried compressed air is forced upwardly through tube 31 to the upper end of the desiccant chamber 25. The dried compressed air at the upper end of the chamber 25 is forced downwardly through the screen 35 and through the desiccant 29 to purge the same of moisture whereby wet compressed air emerges from the screen 33 to the lower end of the desiccant chamber 25 and is passed to the chamber 60 by means of the passageway 88. This wet compressed air in chamber 60 is now exhausted to the atmosphere or to the desired structure by flowing through the open valve seat 79, chamber cavity 78 and passageway 82 to the exhaust conduit 17.

Thus, it can be seen that while the desiccant 30 is removing moisture from the compressed air being passed therethrough, part of the dried compressed air emerging from the desiccant 30 is utilized to purge or remove moisture from the desiccant 29 in order to prepare the desiccant 29 to perform a drying operation in a manner hereinafter described.

While the compressed air is being fed from the conduit 12 to the desiccant 30 in the above manner, part of the compressed air in the chamber 56 of the housing 11 is bled by passageway 90 past variable restrictor 91 to the chamber 59.

Figure 2:
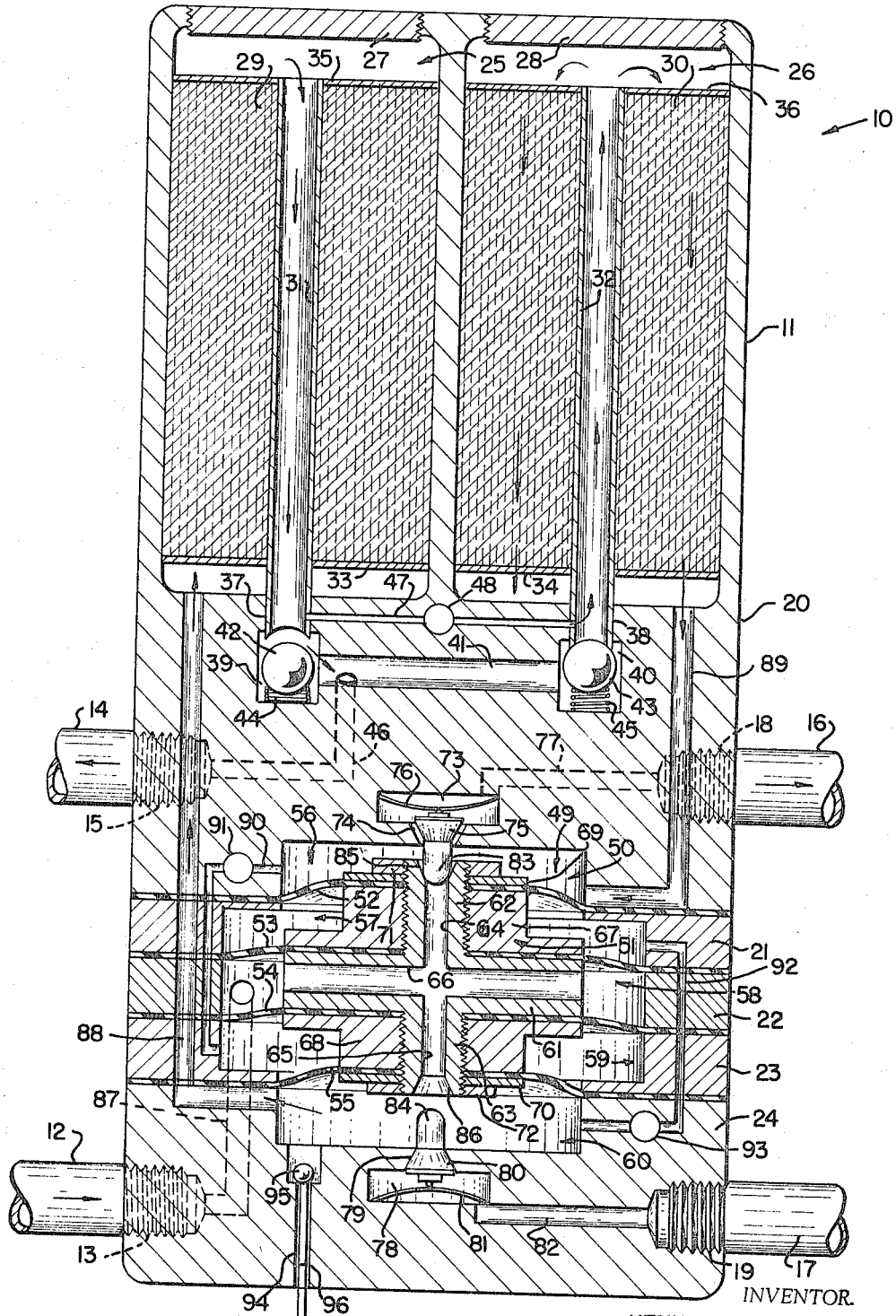
FIGURE 2 is a view similar to FIGURE 1 and illustrates the apparatus of FIGURE 1 in another operating position thereof.

When the pressure in the chamber 59 eventually equals substantially one-half of the pressure in the chamber 56, the valve member 51 moves from the position illustrated in FIGURE 1 to the position illustrated in FIGURE 2 to now direct the compressed air from the conduit 12 to the desiccant chamber 29 so that the desiccant 29 will now remove the moisture from the compressed air, such movement of the valve member 51 being affected by the differences in effective areas of the diaphragms 52 and 54.

Therefore, it can be seen that by adjusting the variable restrictor 91 of the apparatus 10 of this invention, the movement of the valve member 51 from the position illustrated in FIGURE 1 to the position illustrated in FIGURE 2 can take place at any desired time interval.

When the valve member 51 moves from the position illustrated in FIGURE 1 to the position illustrated in FIGURE 2, it can be seen that the valve member 51 has the passage 64 thereof closed off by the end 83 of the valve member 75 while moving the valve member 75 away from the valve seat 74 as illustrated in FIGURE 2. Simultaneously, the valve member 72 seats against the valve seat 79 and the valve member 51 moves away from the end 84 of the valve member 72 so that the passage 65 in the valve member 51 is now interconnected to the chamber 60.

With the valve member 51 now disposed in the position illustrated in FIGURE 2, it can be seen that the compressed air entering the chamber 58 is now directed to the chamber 60 by the opened passage 65 of the valve member 51 whereby the compressed air in the chamber 60 is directed upwardly through the passageway 88 to the lower end of the desiccant chamber 25 to flow upwardly through the screen 33 and desiccant 29 to be dried by the desiccant 29. In this manner, dried compressed air now emerges from the screen 35 into the upper end of the desiccant cavity 25 to be forced downwardly through the tube 31 to open the valve member 42 and flow to the conduit 14 by the interconnected passageways 41 and 46.

However, part of the dried compressed air in the tube 31 is bled by the passageway 47 through the variable restrictor 48 to the lower end of the tube 32 so that the same can now flow upwardly through the tube 32 and down through the screen 36 into the desiccant 30 to purge the same of the previously deposited moisture in the manner previously described.

The wet compressed air now emerges from the screen 34 and flows downwardly through the passage 89 to the cavity 56 and out through the opened valve seat 84 to the exhaust conduit 16.

While the compressed air is flowing from chamber 60 to the desiccant 29 in the above manner to be dried by the desiccant 29, part of the compressed air in the chamber 60 is bled past the restrictor 93 by the passageway 92 to the chamber 57 whereby when the pressure in the chamber 57 equals approximately one-half of the pressure in the chamber 60, the valve member 51 now moves from the position illustrated in FIGURE 2 back to the position illustrated in FIGURE 1 to direct the compressed air 12 back to the desiccant 30 in the above manner, the movement of the valve member being affected by the differences in the effective areas of the diaphragms 55 and 53.

Therefore, it can be seen that by adjusting the position of the variable restrictors 91 and 93, the time intervals for the movement of the valve member 51 back and forth between the positions illustrated in FIGURES 1 and 2 can be so controlled that by the time one of the desiccants 29 or 30 has been purged of the moisture thereof and the other desiccant 29 and 30 has become sufficiently saturated, the compressed air will now be directed to the purged desiccant to be dried thereby while the saturated desiccant will be purged of the moisture thereof whereby the apparatus 10 can continuously supply dried compressed air out of the conduit 14 under the influence of the control means 50.

Therefore, it can be seen that this invention provides an improved apparatus for drying compressed air or the like in a continuous manner while utilizing part of the dried compressed air to purge moisture from the drying means.

When it is desired to initially start the apparatus 10 in the above manner and it is found that the valve member 51 is disposed in a position intermediate the positions illustrated in FIGURES 1 and 2, the valve member 95 can be raised from its valve seat by manually pushing upwardly on the stem 96 to vent the chamber 60 to the atmosphere so that the valve member 51 will move downwardly to the position illustrated in FIGURE 1 to start the cycle of operation thereof in the manner previously described.

While the form of the invention now preferred has been disclosed as required by the statutes, other forms may be used, all coming within the scope of the claims which follow.

What is claimed is:

1. A self-contained drying unit comprising a housing having an inlet means and an outlet means, a first adsorbent means and a second adsorbent means disposed in said housing, and control means disposed in said housing for directing a flow of fluid from said inlet means through said first adsorbent means to provide a flow of dried fluid out through said outlet means when said control means is in one position thereof and for directing a flow of fluid from said inlet means through said second adsorbent means to provide a flow of dried fluid out through said outlet means when said control means is another position thereof, said control means being cycled between its positions by fluid pressure inside said housing, said housing including a plurality of housing parts disposed in stacked relation and respectively defining the exterior of said unit, said housing parts having internal passages formed integrally therein which cooperate with said absorbent and control means to define all fluid flow passageways in said unit whereby no internal and separate fluid flow piping and couplings are required.

2. A self-contained drying unit as set forth in claim 1 wherein said control means is cycled between its positions by pressure differential in said housing.

3. A self-contained drying unit as set forth in claim 1 wherein said control means comprises a diaphragm carried valve member.

4. A self-contained drying unit as set forth in claim 1 wherein said control means comprises a diaphragm carried valve member having opposed openings respectively leading to said adsorbent means.

5. A self-contained drying unit comprising a housing having an inlet means and an outlet means, a first adsorbent means and a second adsorbent means disposed in said housing, control means disposed in said housing for directing a flow of fluid from said inlet means through said first adsorbent means to provide a flow of dried fluid out through said outlet means when said control means is in one position thereof and for directing a flow of fluid from said inlet means through said second adsorbent means to provide a flow of dried fluid out through said outlet means when said control means is in another position thereof, said control means being cycled between its positions by fluid pressure inside said housing, and means in said housing for directing part of the flow of dried fluid from said first adsorbent means through said second adsorbent means to dry the same when said control means is in one position thereof and for directing part of the flow of dried fluid from said second adsorbent means through said first adsorbent means to dry the same when said control means is in another position thereof, said housing including a plurality of housing parts disposed in stacked relation and respectively defining the exterior of said unit, said housing parts having internal passages integrally formed therein which cooperate with said absorbent and control means to define all fluid flow passageways in said unit whereby no internal and separate fluid flow piping and couplings are required.

6. A self-contained drying unit as set forth in claim 5 wherein said control means is cycled between its positions by pressure differential in said housing.

7. A self-contained drying unit as set forth in claim 5 wherein said means for directing part of said dried fluid includes a variable restrictor in said housing.

8. A self-contained drying unit as set forth in claim 5 wherein said housing has exhaust port means for expelling said part of said dried fluid after it has dried its respective adsorbent means.

9. A self-contained drying unit as set forth in claim 8 wherein valve means control said exhaust port means.

10. A self-contained drying unit as set forth in claim 9 wherein said control means operates said valve means.

11. In combination, a first adsorbent means, a second adsorbent means, an inlet means, an outlet means, and control means for directing a flow of fluid from said inlet means through shaid first absorbent means to provide a flow of dried fluid out through said outlet means when said control means is in one position thereof and for directing a flow of fluid from said inlet means through said second adsorbent means to provide a flow of dried fluid out through said outlet means when said control means is in another position thereof, said control means being cycled between its positions in response to the pressure differential between said inlet pressure and a feedback of said inlet pressure, said control means including a movable valve seat member carried by flexible diaphragm means and a pair of movable valve members operatively moved between their operating positions by movement of said valve seat member, said valve members respectively opening and closing the valve seats of said valve seat member.

12. A combination as set forth in claim 11 wherein said valve seat member has opposed openings respectively leading to said adsorbent means.

13. A combination as set forth in claim 11 wherein said valve seat member is so constructed and arranged that the inlet pressure is on one side thereof and the feedback of the inlet pressure is on the other side thereof when said control means is in one position thereof and the inlet pressure is on the other side thereof and the feedback of the inlet pressure is on said one side thereof when said control means is in the other position thereof.

14. A combination as set forth in claim 13 wherein variable restrictor means controls the rate of said feedback pressure.

15. In combination, a first absorbent means, a second absorbent means, an inlet means, an outlet means, control means for directing a flow of fluid from said inlet means through said first adsorbent means to provide a flow of dried fluid out through said outlet means when said control means is in one position thereof and for directing a flow of fluid from said inlet means through said second adsorbent means to provide a flow of dried fluid out through said outlet means when said control means is in another position thereof, and means for directing part of the flow of dried fluid from said first adsorbent means through said second adsorbent means to dry the same when said control means is in one position thereof and for directing part of the flow of dried fluid from said second adsorbent means through said first adsorbent means to dry the same when said control means is in another position thereof, said control means being cycled between its positions in response to the pressure differential between said inlet pressure and a feedback of said inlet pressure, said control means including a movable valve seat member carried by flexible diaphragm means and a pair of movable valve members operatively moved between their operating positions by movement of said valve seat member, said valve member respectively opening and closing the valve seats of said valve seat member.

16. A combination as set forth in claim 15 wherein said means for directing part of said dried fluid includes a variable restrictor.

17. A combination as set forth in claim 15 wherein exhaust port means are provided for exhausting said part of said dried fluid after it has dried its respective adsorbent means.

18. A combination as set forth in claim 17 wherein said valve members control said exhaust port means.

References Cited

UNITED STATES PATENTS

| | | | |
|---|---|---|---|
| 2,625,237 | 1/1953 | Gribler et al. | 55—163 X |
| 3,069,830 | 12/1962 | Skarstrom et al. | 55—62 X |
| 3,080,693 | 3/1963 | Glass et al. | 55—33 X |
| 3,160,486 | 12/1964 | Busch et al. | 55—162 |

REUBEN FRIEDMAN, *Primary Examiner.*

J. W. ADEE, *Assistant Examiner.*